March 19, 1946. E. B. MARPLE 2,396,960
MEANS FOR LOCATING LOST AIRCRAFT
Filed Feb. 15, 1944 3 Sheets-Sheet 1
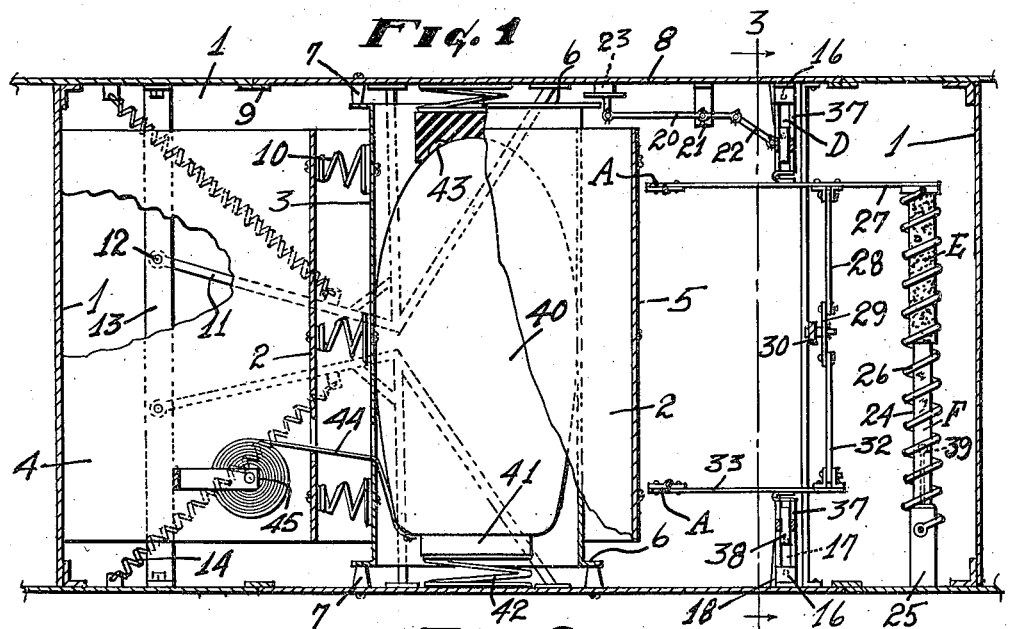
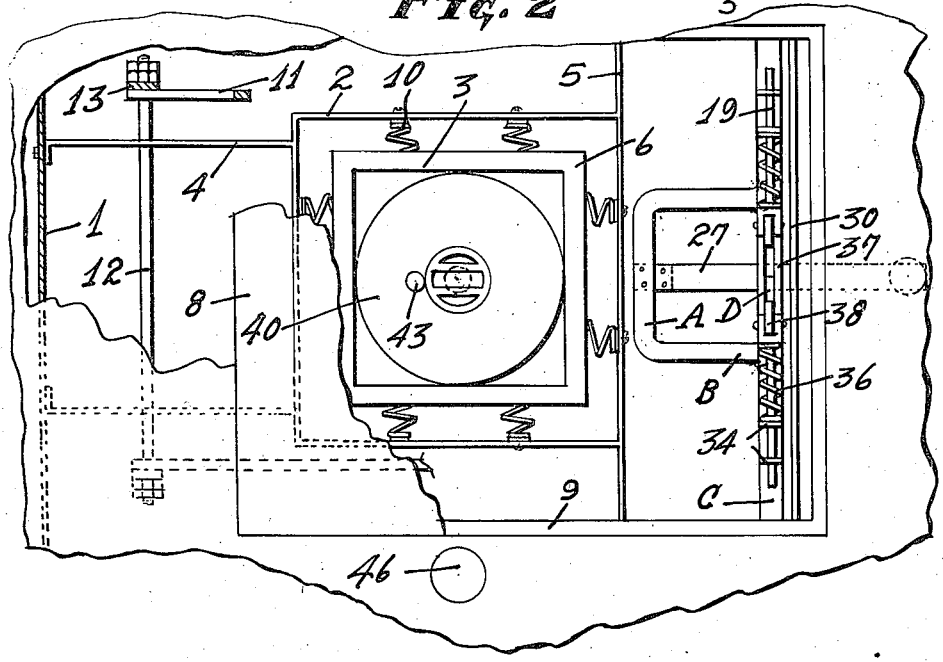
INVENTOR.
ELMORE B. MARPLE March 19, 1946.  E. B. MARPLE  2,396,960
MEANS FOR LOCATING LOST AIRCRAFT
Filed Feb. 15, 1944  3 Sheets-Sheet 2
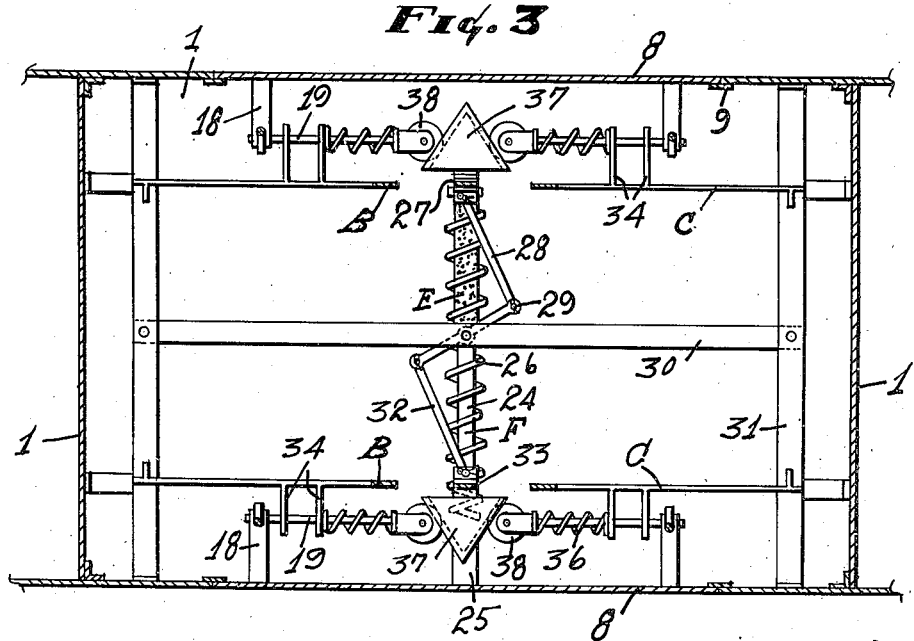
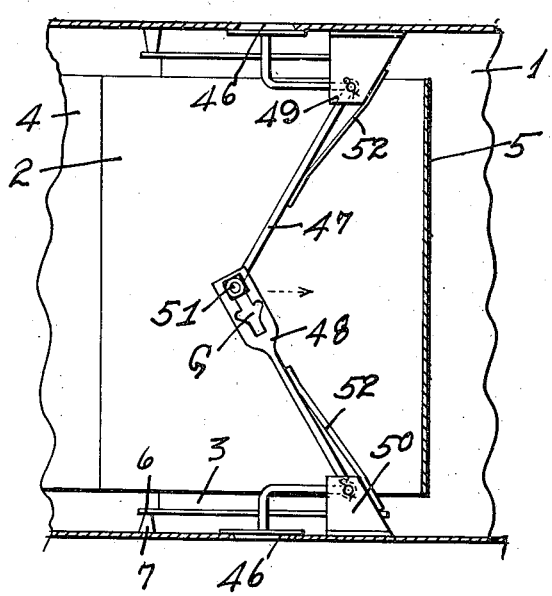
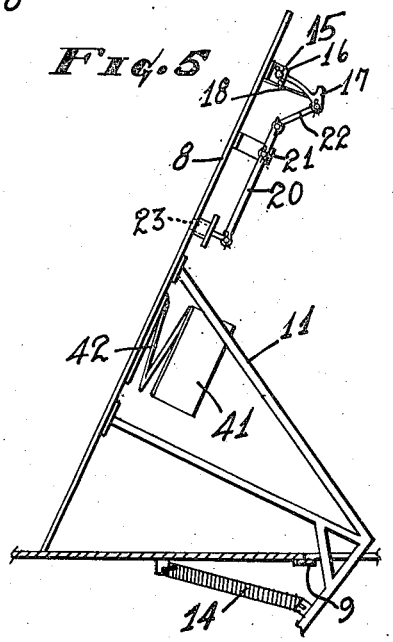
INVENTOR.
ELMORE B. MARPLE
BY

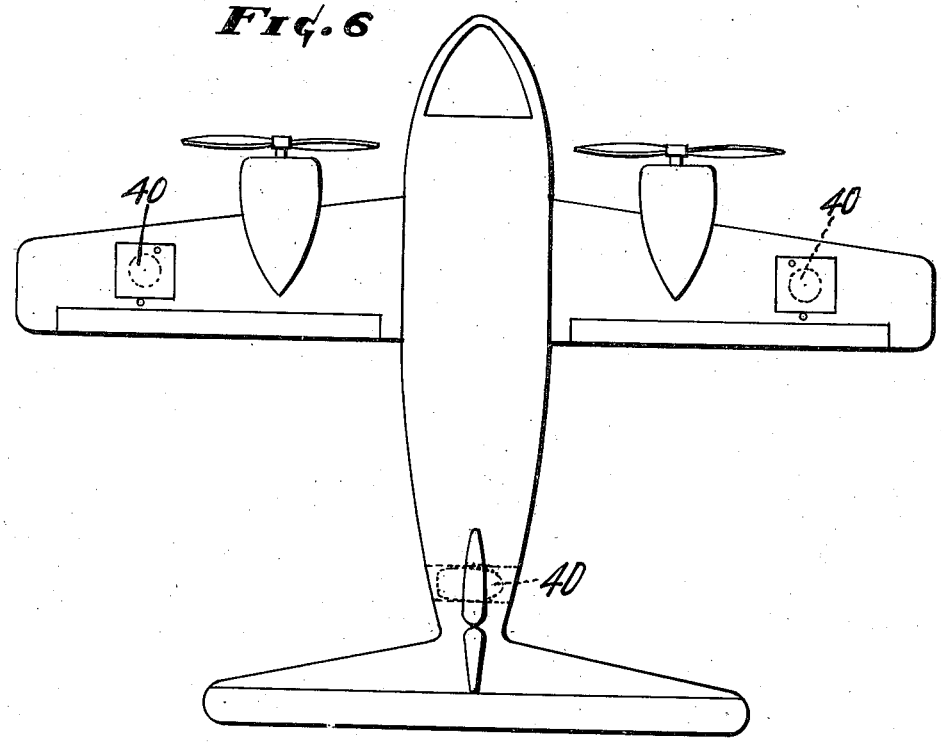

Patented Mar. 19, 1946

2,396,960

UNITED STATES PATENT OFFICE 2,396,960

MEANS FOR LOCATING LOST AIRCRAFT

Elmore B. Marple, Wichita, Kans.

Application February 15, 1944, Serial No. 522,435

2 Claims. (Cl. 177—329)

This invention relates to means for locating lost aircraft, and has for its principal object a series of tunnels passing through the wings, tail, or other parts of the aircraft, whereby illuminating elements concealed in the tunnels are free to discharge from either end thereof as the case may require at the time of the aircraft's disaster, whether on land or submerged in a body of water.

A further object of this invention is to provide rockably connected lids to close the ends of each tunnel, and being securely locked, and each lid subject to being opened either by a jar when wrecked on land or by water when the aircraft is submerged, at which instant, in either kind of disaster, the illuminating elements may emerge from the lid that is upwardly positioned, and by this arrangement of the tunnel, the illuminating elements will not be trapped against their discharge.

These and other objects will be more fully explained, reference being had to the accompanying drawings forming a part of this specification, and in which like characters will apply to like parts in the different views.

Referring to the drawings:

Fig. 1 is a sectional view through a selected portion of an aircraft to illustrate the tunnel extending therethrough to provide an exit at each end thereof, through which an illuminating element contained in the tunnel may pass from either end thereof.

Fig. 2 is a plan view of Fig. 1, looking through the tunnel.

Fig. 3 is a view taken on line 3—3 in Fig. 1, looking in the direction of the arrows.

Fig. 4 is a side view of the water control valves and levers, the valves being in their closed position.

Fig. 5 is a side view of a lid and carrying means therefor in its open position.

Fig. 6 is a plan view of an aircraft to illustrate positions of the tunnels that may be adopted.

The invention herein disclosed consists chiefly of a tunnel positioned in a compartment consisting of four sides 1 that surround the tunnel as shown in Fig. 1, but subject to change according to position in an aircraft. The tunnel consists of two rectangular walls 2 and 3, respectively, 2 representing the outer wall, while wall 3 is the tunnel portion that extends through a selected position of the aircraft structure.

It will be seen that the outer wall 2 is rigidly supported by its respective plate elements 4 and 5. Plate 5 may be an extension of wall 2, or brackets may substitute the extension.

The portion of the tunnel extending through the structure and being interposed in walls 2 consists of four side walls 3 spaced inward from the first said walls and being in parallelism therewith. The outer ends of said walls 3 each have flanges 6 extending outward as shown in Fig. 1 to form a bearing on which flexible legs 7 will sit, the said legs being secured to their respective lids 8 and being spaced therearound while the peripheral edges of said lids will sit on flanges 9 that are secured to the inner side of the aircraft shell, whereby said lid is substantially water tight when closed, and later more fully described.

It will be understood that the inner wall of the tunnel structure is free to wabble and being supported by a plurality of springs 10 positioned in spaced relation transversely and longitudinally of the tunnel as shown in Figs. 1 and 2, said springs to function as shock absorbers to avoid excess jar under normal flying of the aircraft and at the time of its disaster.

The lids heretofore mentioned are rockably mounted on the outer ends of brackets 11 while the inner ends are rockably mounted on their respective rods 12 that are secured to their respective bar elements 13 that are attached to the shell of the craft as shown in Figs. 1 and 2, and the said brackets each having a coil spring 14 as tensioning means to open the lids simultaneously by securing one end of each spring to its respective bracket while the other end is secured to said compartment top outward from its opening.

It will be understood that a lid for each end of the tunnel is provided and adapted to open and close simultaneously while the following description will have reference to one lid but apply to each thereof.

Positioned in the compartment opposite the bracket carrying rod and being a spaced distance downward from the under side of each lid is another rod 15 that is rockably trunnioned in ears 16 that are secured to the lid. Rigidly secured to last said rod adjacent the inner side of each ear is a hook 17, downwardly extending and being tensioned by leaf spring 18 to cause engagement of the hooks with their respective lock bolts 19 as securing means for the said lid in its closed position when forced downward as shown in Figs. 1 and 2.

An accessible means to the tunnel under normal conditions, one lid may be opened by mechanical arrangement, or the said hooks may be manually released by a cantilever 20 rockably mounted on a post 21, said lever having a link 22 connecting one end of the lever to one end of the hook as shown in Fig. 1, and by a downward press on a button 23, that is in registry with an aperture in the lid will rock the hooks from engagement with the lock bolts.

There is also provided another means to unlock the lids which in turn will automatically open the same through the medium of their springs heretofore described, said means consisting of a cylindrical stem 24 vertically positioned and seated on a post 25, that is secured to the bottom of the compartment. Wound on the stem is a spring element 26, having its lower end secured to the post 25, the upper end being secured to a rockable arm 27, said arm being pivotally connected to one end of an arm 28 while the other end of said arm is pivotally connected to one end of a lever 29, that is rockably mounted at its longitudinal center on a horizontal bar 30, the ends of which are secured to vertically disposed bars 31 that are supported by the walls of the enclosure and a similar arm 32 being connected to the other end of lever 29 and to a similar arm 33. The outer ends of each of said arms 27 and 33 are hingedly connected to U-shaped members at their longitudinal center of their portions A that integrally join corresponding ends of its legs B, the other ends of the legs having portions C outwardly extending in opposite directions and being connected to their respective vertical bars 31, whereby a bearing is made for standards 34 that are positioned in pairs, the free ends of which are apertured to receive the lock bolts 19 slidable therein to move toward and from each other longitudinally, each lock bolt having a spring 36 wound thereon, the ends of which are secured in such a way as to move said bolts inward toward each other to unlock the lids, the outer ends thereof adapted to engage with their respective hooks 17 to lock the lids in their closed position when forced outward by a triangular grooved head 37 positioned between the confronting ends of said bolts, each of which have a roller 38 journalled on their said confronting ends and adapted to engage the grooves D of the triangular heads 37.

It will be seen that each of the grooved heads is pivotally connected to arms 27 and 33 as carrying means therefor to move the same toward and from each other as actuated by the said rockable lever 29 heretofore described, and to actuate the movement of the rockable lever it will be seen in Fig. 1 that arm 27 having its bearing upon the said cylindrical stem 24 and being connected to said spring 26 wound on the stem is means whereby when the stem is collapsed as later described, the heads will be forced toward each other by contraction of the spring to unlock both lids.

The stem above referred to as being cylindrical in form, it will be seen that one portion E thereof is solid and being of a material that will readily dissolve when submerged in water as one means to collapse the stem, the other portion F being hollow and preferably made of glass to break easily under the force of impact, or by a weight 39 pendantly carried as shown by dotted lines in Fig. 1 that is free to contact the glass under force of impact, whereby the stem will also collapse. Consequently, in either event, the locks for the lids will be disengaged and free to swing open as heretofore described to permit an illuminating element 40 to emerge from either end of the tunnel as the case may require whether submerged in water or destruction of the aircraft takes place on land; in either event the said illuminating element will be conducted from the tunnel by gravity or buoyancy from the end of the tunnel positioned favorably to such conditions. However should the illuminating element be retained in the tunnel on land, the same would be discernible as each end thereof is provided with an electrically energized lamp.

Positioned between the end of the illuminating element and its respective lids are block arrangements 41 carried by a spring 42, said blocks confronting the lenses and adapted to press a switch element 43 inward to break the electric circuit, and when either or both lids are unlocked and thrown open the circuit will be closed automatically. It will be understood that a miniature electric plant is contained inward of the illuminant element.

In Fig. 1 is shown a cord 44 wound on a drum 45, the free end of said cord being secured to the lower end of the illuminating element, and when the aircraft is submerged in water the illuminant element will unwind the cord sufficient for said element to remain on the surface of the water in close range from the aircraft whereby it can be readily located.

As a means to insure water entering the compartment, there is provided a pair of valves 46 adapted to engage in apertures formed in opposite walls of the compartment, said valves being connected by jointed arms 47 and 48, each of which is rockably mounted in their respective ears 49 and 50. It will be seen that arm 48 at its free end is bifurcated to slidably receive a headed pin 51 secured to the free end of the other arm, and the neck of the pin when the valves are opened will engage in a bayonet notch G as locking means to retain the valves disengaged from their apertures. To cause engagement of the valves there is provided a leaf spring 52, said spring to yield under pressure of water when the aircraft is submerged; furthermore the bayonet engagement will automatically lock itself under tension of the spring to insure an open position of said valves.

Modifications may be made as lie within the scope of the claims.

Having fully described my invention what I claim as new and desire to secure by Letters Patent is:

1. In means for locating lost aircrafts, in combination, a tunnel extending through a selected structure of an aircraft for outward communication at either end of the tunnel, said tunnel being of suitable length, the ends of which are removably closed, an illuminant element removably placed in the tunnel and having an anchor line attached thereto and to structure surrounding the tunnel, the line being wound on a reel and adapted to unwind as the said illuminant element moves outward from the tunnel, shock absorbing means for the tunnel at the instant of impact when the aircraft is wrecked, lids to open and close the ends of the tunnel, automatic means to open the lids by impact at the wrecking moment of the aircraft, and electric circuit means to illuminate the element at both ends thereof by opening movement of the lids to close the circuit.

2. In means for locating lost aircrafts, as recited in claim 1, said automatic means comprising an element subdivided near its longitudinal center with respect to destructible material to normally retain the lids in a closed position under normal conditions, one portion of the subdivided element being deteriorated by water as a solvent therefor to release the lids, the other portion being subject to breakage by abnormal impact of the aircraft with an obstacle to likewise release the lids, and a coil spring wound on the locking means to open the lids at the time of deterioration of said portions.

ELMORE B. MARPLE.